UNITED STATES PATENT OFFICE.

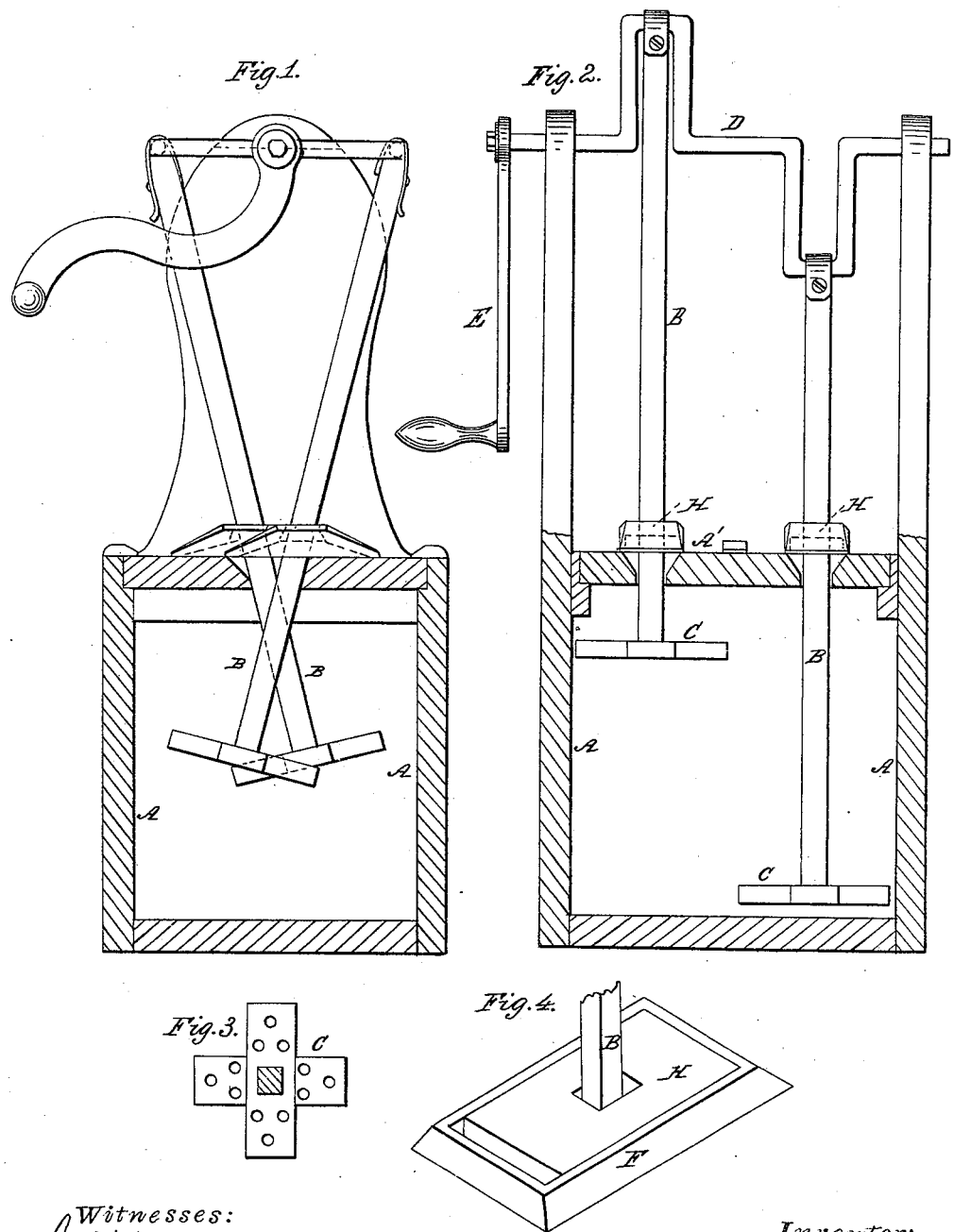

C. L. GILPATRICK, OF SACO, MAINE.

CHURN.

Specification of Letters Patent No. 25,405, dated September 13, 1859.

*To all whom it may concern:*

Be it known that I, C. L. GILPATRICK, of Saco, in the county of York and in the State of Maine, have invented certain new and useful Improvements in Churns; and I do hereby declare the following to be a full, clear, and exact description of the same, reference being had to the accompanying drawings and the letters of reference marked thereon.

The nature of my invention consists in the employment of the two slides, being operated upon by the two dasher-staffs, in the manner and for the purpose which will be herein after fully set forth.

To enable others skilled in the art to make and use my invention I will now describe its construction and operation.

In the drawings—Figures (1 and 2) are side elevations. Fig. (3) is a plan view of the dasher. Fig. (4) represents the box in which the slide operates.

In Figs. (1 and 2) (A.) represents the churn which may be constructed in the form of a square or rectangular box, with two opposite sides extending up to a sufficient height for the support of crank-shaft (D) and to enable said shaft to operate more beneficially upon the dasher-staffs. The shaft (D.) is so constructed or bent as to form two cranks as fully represented in Fig. (2).

(B, B.) are two dasher-staffs to which are secured dashers (C, C.) Said dashers are constructed of two flat pieces of board crossing each other at right-angles, in which holes are bored as represented in the drawings. The other ends of dasher-staffs are attached to cranks on shaft (D) by means of collars passing around said cranks.

(F) represents a casing or box—two of which are placed on top of the churn, around the dasher-staffs.

(H, H,) represent slides which are placed in said casings—through the center of which are holes for the admission and play of dasher-staffs. Said holes should be somewhat larger than the dasher-staffs, to enable them to operate freely. The slides are made shorter than the casings in order they may partake of the full motion of the dasher-staffs.

(E.) is the crank by which the shaft (D) is operated.

The operation of my machine is as follows: A sufficient quantity of milk being placed in the churn, the top is adjusted in its proper place. Motion is then communicated to the dashers by means of the crank-shaft. As one dasher descends, the other ascends. Thus the milk is kept in contant agitation, which is necessary in order to churn expeditiously. The slides being operated upon by the dasher-staffs prevents the milk from splashing out, as it otherwise would do.

Having thus fully described my invention, what I claim as new and desire to secure by Letters Patent is—

The combination of the crank-shaft D, and staffs B, B, with the top A′, when said top is provided with boxes (F,) in which play slides, through which the staffs pass, the same being arranged and operating substantially as and for the purpose specified.

CABLE L. GILPATRICK.

Witnesses:
 GEO. H. KNOWLTON,
 J. K. MARSH.